UNITED STATES PATENT OFFICE.

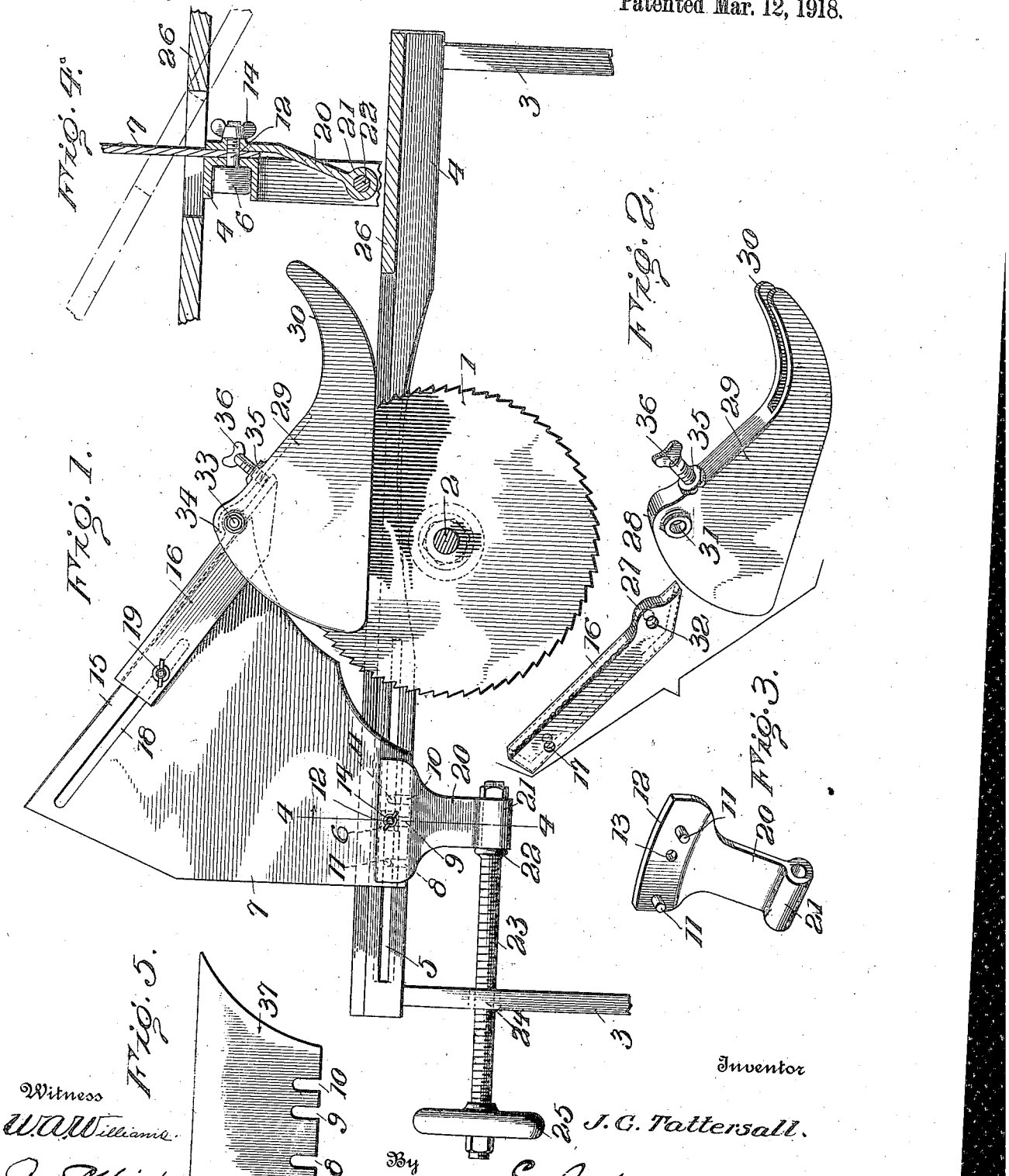

JAMES G. TATTERSALL, OF NIAGARA FALLS, NEW YORK.

SAW-GUARD AND SPLITTER.

1,258,961.

Specification of Letters Patent.    Patented Mar. 12, 1918.

Application filed March 9, 1916. Serial No. 83,115.

*To all whom it may concern:*

Be it known that I, JAMES G. TATTERSALL, a citizen of the United States, residing at Niagara Falls, in the county of Niagara and State of New York, have invented certain new and useful Improvements in Saw-Guards and Splitters, of which the following is a specification, reference being had therein to the accompanying drawing.

This invention relates to certain new and useful improvements in saw guards and splitters capable of being used in connection with universal or stationary saws; the object being to provide an adjustable guard for protecting the circular saw in connection with a splitter for holding the material being cut, so as to prevent the same from being taken up by the teeth of the saw as the material is discharged therefrom.

Another object of my invention is to provide novel means for mounting the guard and splitter in order to allow the table to be moved independently thereof so as to tilt the same in order to cut the bevel.

Another object of my invention is to provide a guard in the form of a shoe carried by a slidably mounted member in such a manner, that the same will rise when the material is passing under the guard and drop back into its original position after the material has passed from under the same.

Another object of my invention is to provide a saw guard and splitter which is exceedingly simple and cheap in construction and one which is adjustably mounted in order to allow the same to be moved in respect to the saw as the saw is adjusted.

Other and further objects and advantages of the invention will be hereinafter set forth and the novel features thereof defined by the appended claims.

In the drawing—

Figure 1 is a side elevation of my improved construction of saw guard and splitter showing the application of the same to a universal circular saw;

Fig. 2 is a perspective of the guard shoe and slidable support therefor, detached;

Fig. 3 is a perspective of the clamping member for the splitter of the guard;

Fig. 4 is a section taken on the line 4—4 of Fig. 1; and

Fig. 5 is a side elevation of a slightly modified form of splitter adapted to be used in cross cutting.

Like numerals of reference refer to like parts in the several figures of the drawing.

In the drawing, 1 indicates a circular saw mounted upon an arbor 2 carried by a suitable adjustable bed, not shown, in order to allow the saw to be moved; said bed having standards 3 connected together by a channel bar 4 which is provided with a slotted portion 5 through which extends the shank of a bolt 6, the head of which is slidably mounted within the channel of the bar 4, as clearly shown in Fig. 4.

Arranged against the channel bar 4 is a splitter 7 which is provided with spaced notches 8, 9 and 10; the notch 9 being adapted to receive the bolt 6 and the notches 8 and 10 being adapted to receive pins 11 carried by a bowed flexible clamping member 12 which is provided with an opening 13 to receive the bolt 6; the outer face of said clamping member having a boss surrounding said opening adapted to be engaged by a thumb nut 14 mounted upon the bolt 6 so as to clamp the splitter 7 against the side of the channel bar 4 in such a manner that it will be held in vertical position and yet is capable of being moved longitudinally of the bar so as to adjust the position of the same in respect to the circular saw 1.

The splitter 7 is arranged in alinement with the saw 1 and is provided with an inclined or oblique upper edge 15 on which is slidably mounted a channel support 16 which is provided with a transverse bore 17 in alinement with a slot 18 formed in the splitter 7 and through which a bolt 19 passes carrying a thumb nut for holding the slidable support in position upon the splitter in such a manner that the same is free to slide thereon, as will be hereinafter fully described.

The clamping member 12 is provided with a depending arm 20 terminating in a sleeve portion 21 in which is revolubly mounted the bearing end 22 of a feed screw 23 which extends through a threaded bore 24 formed in one of the standards 3 and is provided with a hand-wheel 25 for operating the same, whereby the splitter can be adjusted in respect to the saw 1.

As the saw 1 is adjusted, the splitter is moved so as to maintain its relative position in respect thereto by operating the handwheel 25 and through its connection with the splitter, through the medium of the clamping member 12, the same can be readily moved back and forth on the slotted bar and will be maintained in its adjusted position.

Arranged above the bar 4 is a slotted table 26 which is capable of being adjusted so as to move the same at an angle to the saw, as shown in Fig. 4, in order to allow the saw to cut a bevel on the material being operated upon; the table being adjustable independently of the bed upon which the standards 3 are mounted and which also carries the bearings for the saw arbor 2, not shown.

The lower end of the slidable support 16 is provided with an enlarged portion 27 over which is arranged the curved portion 28 of a guard shoe 29 adapted to straddle the saw 1 and provided with a bifurcated toe portion 30 so as to allow the shoe to move over the saw.

The shoe is provided with oppositely disposed apertured bosses 31 adapted to aline with a transverse bore 32 formed in the support 16 and through which a pivot pin 33 passes for pivotally mounting the shoe on the support 16 in such a manner that the shoe is capable of rocking thereon; the upward movement of which is limited by the wall 34 of the shoe which engages the top of the support and prevents the shoe from rocking in an upward direction and it will be seen that this wall 34 is spaced from the upper portion of the shoe 16 so as to allow the shoe to rock slightly when the material is forced under the same, and as the material passes under the shoe, the support 16 is moved upwardly on the splitter and as the material passes from under the shoe, the shoe and support 16 slide back into their normal positions by gravity.

A threaded apertured boss 35 is formed in the top of the shoe in which an adjusting screw 36 is mounted adapted to engage the tip of the support 16 whereby the bottom portion of the shoe can be adjusted so as to be in the same plane with the upper surface of the table 26 as by operating the screw 36, the rocking movement of the shoe in a downward direction, is limited.

It will be seen that the bar 4 forming the support for the splitter carrying the guard, is mounted upon the bed carrying the adjustable saw over which is arranged the adjustable table whereby the table can be moved independently of the saw so as to throw the material being operated upon, at an angle to the cutting edge of the saw in order to allow a bevel to be cut on the material and by having the splitter adjustably mounted as the adjustable saw is moved, the splitter can be adjusted in respect thereto so that the shoe will be held in its proper position in respect to the saw.

In the modification shown in Fig. 5, a splitter 37 having a straight upper edge is shown, which is especially adapted to be used when cross cutting, the notches formed in the lower edges of the splitter being of sufficient depth to allow the splitter to be raised and lowered to suit the thickness of the material being sawed.

In the operation of a splitter and guard as herein shown, as the board to be sawed is forced under the shoe, the shoe is raised by the sliding member moving on the inclined face of the splitter and as the saw eats its way into the material, the splitter enters the opening thus formed so as to spread the kerf and prevent the saw from taking up the end of the board as the board passes from under the guard.

The guard is so arranged that the saw is protected so as to prevent the operator from being injured.

I claim:

1. In a device of the kind described, the combination with a tilting table provided with a slot, of a channel bar arranged beneath said table to one side of said slot, a bolt mounted in the slot of said channel bar, a splitter member mounted upon said bolt and extending upwardly through said slot, a clamping member carried by said bolt engaging said splitter member, and a feed screw having a connection with said clamping member.

2. In a device of the kind described, the combination with a channel bar having a slot, a bolt mounted in said slot, a splitter member arranged against the face of said channel bar having a notch to receive said bolt, a flexible clamping member secured against the opposite face of said splitter member by said bolt, and means connected to said clamping member for adjusting the position of said splitter member on said channel bar.

3. A saw guard and splitter, comprising a vertically disposed splitting member having an oblique upper edge, a member embracing said splitter member and slidably mounted thereon, and a shoe pivotally mounted upon said member.

4. In a saw guard and splitter, the combination with a channel bar having a slot, of a bolt having its head disposed within the channel of said bar and its shank extending through the slot thereof, a splitter member provided with a notch to receive said bolt, a clamping member having an opening to receive said bolt, pins carried by said clamping member extending through the notches formed in said splitter member, said clamping member having a depending arm provided with a bearing sleeve, and a feed screw having its ends revolubly mounted in said sleeve for adjusting said splitter member on said channel bar.

5. A saw guard, comprising a sheet metal splitter member, having an oblique upper edge and provided with a longitudinal slot adjacent said edge, of a gravity channel member embracing the upper edge of said splitter member having a bolt extending through the slot thereof, and a shoe pivotally mounted upon the lower end of said channel member.

In testimony whereof I hereunto affix my signature in the presence of two witnesses.

JAMES G. TATTERSALL.

Witnesses:
 EDNA A. LIEBIG,
 FRANK C. KING.